United States Patent
Muthukumar et al.

(10) Patent No.: US 12,457,549 B2
(45) Date of Patent: Oct. 28, 2025

(54) SERVING GATEWAY SELECTION BASED ON PACKET DATA NETWORK TYPE

(71) Applicant: T-Mobile USA, Inc., Bellevue, WA (US)

(72) Inventors: Praveen Singaram Muthukumar, Lawrenceville, NJ (US); Rahul Pal, Bellevue, WA (US); Rushabhkumar Patel, Newcastle, WA (US); Karunakalage Viraj Rakitha Silva, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 523 days.

(21) Appl. No.: 17/719,717

(22) Filed: Apr. 13, 2022

(65) Prior Publication Data

US 2023/0337120 A1 Oct. 19, 2023

(51) Int. Cl.
*H04W 48/18* (2009.01)
*H04W 60/04* (2009.01)
*H04W 88/16* (2009.01)

(52) U.S. Cl.
CPC ........... *H04W 48/18* (2013.01); *H04W 60/04* (2013.01); *H04W 88/16* (2013.01)

(58) Field of Classification Search
CPC ..... H04W 48/18; H04W 48/20; H04W 60/04; H04W 76/00; H04W 76/12; H04W 88/02; H04W 88/16; H04W 88/18
USPC ........................................................ 370/329
See application file for complete search history.

(56) References Cited

U.S. PATENT DOCUMENTS

| | | | | |
|---|---|---|---|---|
| 9,326,312 B2* | 4/2016 | Wang | ..................... | H04W 76/19 |
| 10,602,350 B2* | 3/2020 | Kim | ......................... | H04W 8/28 |
| 11,139,884 B1* | 10/2021 | Singh | ..................... | H04W 72/20 |
| 11,463,311 B2* | 10/2022 | Maria | ................. | H04L 43/0817 |
| 11,683,714 B2* | 6/2023 | Chitta | ................. | H04L 61/2571 |
| | | | | 370/230 |
| 12,144,039 B2* | 11/2024 | Kuroda | ..................... | H04W 8/02 |
| 2010/0254399 A1* | 10/2010 | Shin | ......................... | H04L 69/16 |
| | | | | 370/415 |
| 2015/0055510 A1* | 2/2015 | Gao | ....................... | H04W 76/10 |
| | | | | 370/254 |
| 2017/0126618 A1* | 5/2017 | Bhaskaran | .......... | H04L 61/5014 |
| 2018/0206275 A1* | 7/2018 | Jain | ......................... | H04L 12/56 |
| 2018/0213587 A1* | 7/2018 | Kim | ...................... | H04W 76/19 |
| 2018/0270891 A1* | 9/2018 | Kim | ...................... | H04W 76/19 |
| 2018/0352593 A1* | 12/2018 | Velev | ....................... | H04L 67/12 |
| 2019/0007984 A1* | 1/2019 | Kuroda | .................. | H04W 76/15 |
| 2019/0141581 A1* | 5/2019 | Syue | ....................... | H04W 76/14 |
| 2019/0386894 A1* | 12/2019 | Hu | ......................... | H04W 12/06 |

(Continued)

*Primary Examiner* — Jean A Gelin
(74) *Attorney, Agent, or Firm* — Lee & Hayes, P.C.

(57) ABSTRACT

System and methods for efficient serving gateway and packet data gateway selections are described. A mobile device may attempt transmit an attach request to a network requesting packet data services in a particle protocol. A control plane of a serving gateway may receive the attach request and determine a serving gateway user plane that is configured to operate in the specified protocol. The serving gateway control plane may then propagate the determined serving gateway user plane to a packet data network gateway control plane for selection of the serving gateway user plane and a corresponding packet data network gateway user plane for use in providing packet services to the mobile device.

16 Claims, 9 Drawing Sheets

(56) References Cited

U.S. PATENT DOCUMENTS

| | | | | |
|---|---|---|---|---|
| 2020/0037220 A1* | 1/2020 | Velev | .................... | H04W 76/27 |
| 2020/0314704 A1* | 10/2020 | Abdel Shahid | ....... | H04W 36/14 |
| 2020/0404542 A1* | 12/2020 | Jing | ...................... | H04W 28/10 |
| 2021/0051517 A1* | 2/2021 | Johansson | ............. | H04W 76/12 |
| 2021/0195490 A1* | 6/2021 | Rommer | ................. | H04W 8/08 |
| 2022/0038959 A1* | 2/2022 | Hoffman | ........... | H04W 36/0005 |
| 2022/0086864 A1* | 3/2022 | Sabella | ............... | H04W 72/535 |
| 2022/0167182 A1* | 5/2022 | Ramamurthi | ......... | H04W 24/02 |
| 2022/0369163 A1* | 11/2022 | Gundavelli | ........... | H04W 88/06 |
| 2022/0369182 A1* | 11/2022 | Gundavelli | ......... | H04W 36/087 |
| 2022/0386393 A1* | 12/2022 | Tamvada | .............. | H04W 48/18 |
| 2023/0102300 A1* | 3/2023 | Faccin | ................. | G08G 5/0078 |
| | | | | 455/435.1 |
| 2023/0126490 A1* | 4/2023 | Rahman | ................ | H04W 12/61 |
| | | | | 455/411 |
| 2023/0126496 A1* | 4/2023 | Medarametla Lakshmi | ................ | |
| | | | | H04W 16/22 |
| | | | | 455/446 |

* cited by examiner

SERVING GATEWAY SELECTION BASED ON PACKET DATA NETWORK TYPE

BACKGROUND

Since the advent of the Internet, the number of computing devices connected to it has grown exponentially. The primary network or Internet layer protocol un use during the initial growth if the Internet was Internet Protocol version 4 (IPv4). However, the number of devices predicted to be connected to the Internet was anticipated to far outstrip the number of available device addresses supported by IPv4. This led to the proposal and adoption of the Internet Protocol version 6 (IPv6), which provides, among other enhancements, many more addresses for use by computing devices connected to the Internet than IPv4. However, there are many devices and systems currently in use that are configured to use IPv4. Therefore, network and system operators continue to support IPv4. Efficiently supporting IPv4 devices while concurrently supporting IPv6 devices on current networks may pose a challenge for a network operator.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
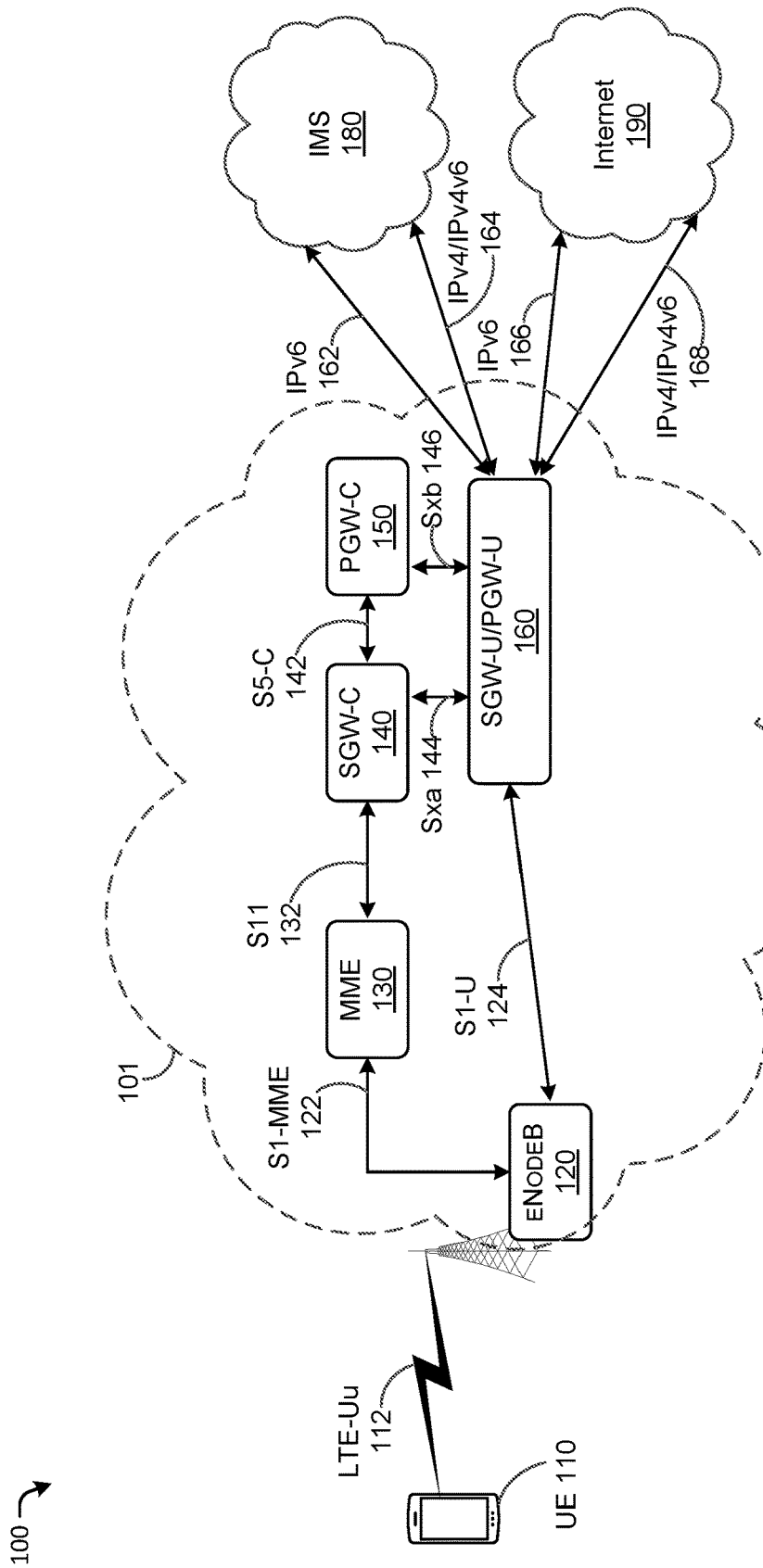
FIG. 1 is a schematic diagram of an illustrative wireless communication network environment in which systems and techniques for serving gateway selection may be implemented, in accordance with examples of the disclosure.

This disclosure is directed in part to systems and techniques for more efficiently performing serving gateway selection for a user equipment (UE) (e.g., smartphone, cell phone, mobile device, wireless communication device, mobile station, etc.) in advanced wireless communications networks. Such advanced networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with network and/or remote devices using any protocol.

In conventional systems, a UE may request access to a network by sending a request for such access to a base station configured in the network (e.g., an eNodeB, gNodeB, etc.). This access request may also be referred to as an "attach request." A UE's attach request may (explicitly or implicitly) indicate one or more network layer communications protocols that the UE may be configured to support. For example, such a request may be a request for an IPv4-only communications connection, an IPv6-only communications connection, or an IPv4v6 communications connection. A request for an IPv4-only communications connection may indicate that the UE can only support IPv4 communications. A request for an IPv6-only communications connection may indicate that the UE can only support IPv6 communications. A request for an IPv4v6 communications connection (also known as a "dual stack" connection) may indicate that the UE supports both IPv4 and IPv6. Such a UE may prefer to use IPv6 but is able to use IPv4 in the event that an IPv6 connection is not available, for example, because the network does not support IPv6. If the network supports IPv4 and IPv6, the UE may determine to which protocol to use for the requested connection. In various embodiments, an attach request may include a packet data network (PDN) type indicator or value or that indicates an IP version supported and/or requested by the UE (e.g., IPv4, IPv6, IPv4v6).

A base station may forward a UE's attach request to a control plane function or component on a serving gateway (SGW-C). Based on the attach request, the SGW-C may select a user plane function or component on an available serving gateway (SGW-U). Typically this selection will be random, round-robin, and/or based on the utilization and/or availability of potential SGW-Us without accounting for IP versions or PDN types. The SGW-C may provide information associated with the selected SGW-U to a control plane function or component of a PDN gateway (PGW-C). The PGW-C may then select the SGW-U indicated by the SGW-C to serve the UE. As the selected SGW-U may be co-located with a user plane function or component of a PDN gateway (PGW-U), by selecting the SGW-U, the PGW-C may also select the co-located PGW-U to provide packet-based services to the UE.

In various embodiments, an SGW-U and a PGW-U may be "co-located." A co-located SGW-U and PGW-U may alternatively be referred to as an "SGW-U/PGW-U." The term "co-located" as used herein in regard to functions such as the SGW-U and PGW-U functions indicates that such functions share network and/or physical resources. For example, a co-located SGW-U and PGW-U may be configured on a single computing system (e.g., server, network device, etc.). A co-located SGW-U and PGW-U may also, or instead, share common network resources, such as addresses. For example, a co-located SGW-U and PGW-U may share a common IPv4 address. For a co-located SGW-U and PGW-U, this shared common address may be used as an identifier for one or both functions. For example, a PGW-C may identify, configure, or otherwise associate as a PGW-U the address associated with a co-located SGW-U and PGW-U, while an SGW-C may identify, configure, or otherwise associate as a SGW-U the same address associated with the same co-located SGW-U and PGW-U.

Because the SGW-C may not take into account an IP version that may be preferred or supported by a UE making an attach request, the SGW-C may select a SGW-U that is not fully compatible with the UE and that may therefore result in service interruption for the UE or otherwise provide poor service quality to the UE. For example, in response to an attach request from a UE, an SGW-C may select an IPv6 SGW-U and indicate an identifier of the selected IPv6 SGW-U (which may also serve as an identifier of a co-located PGW-U) to a PGW-C, which in turn causes the PGW-C to select the IPv6 PGW-U associated with the identifier of the selected IPv6 SGW-U. If the UE supports only IPv4, the resulting communications connection may be negatively impacted due to the incompatibility of the network communications used by UE and the selected gateways, which may in turn negatively impact packets traversing higher layers of this communications connection.

In various embodiments, an SGW-C may be configured to determine a PDN type indicated in an attach request and use this information to select an SGW-U. For example, an SGW-C may receive an attach request from a UE via, for example, an eNodeB and a mobility management entity (MME). The SGW-C may determine the PDN type indicated in the attach request (e.g., IPv4, IPv6, IPv4v6). Alternatively, or in addition, the attach request may include data that may indicate or otherwise be used to determine a protocol type (e.g., a packet data protocol (PDP) type or identifier). Any such data may be used in the disclosed embodiments as a PDN type. Based on the PDN type, the SGW-C may select a corresponding SGW-U. For example, if the PDN type is IPv4, the SGW-C may select an IPv4 SGW-U; if the PDN type is IPv6, the SGW-C may select an IPv6 SGW-U; and if the PDN type is IPv4v6, the SGW-C may attempt to select an IPv6 SGW-U but may fall back to selecting an IPv4 SGW-U if an IPv6 SGW-U is not available. In various embodiments, the SGW-C selecting the SGW-U may include the SGW-C determining an address (e.g., IPv4 address) of an SGW-U that may be co-located with a PGW-U and that may use the same address (e.g., as an identifier).

In such embodiments, the SGW-C may provide information associated with the selected SGW-U to a PGW-C. The information may include the address of the SGW-U, which the PGW-C may recognize and/or determine to be the address of a PGW-U because the SGW-U and the PGW-U may be co-located. The PGW-C may use this information (e.g., SGW-U/PGW-U address) to determine and/or assign the PGW-U for providing service to the UE. An SGW-U associated with a particular protocol (e.g., IPv4 or IPv6) may typically be col-located with a PGW-U associated with the same protocol and may therefore share a same address that may serve as an identifier for both the SGW-U and the PGW-U. Therefore, by selecting an SGW-U associated with the protocol indicated by the PDN type in the attach request received from the UE, the SGW-C causes the selection of a c-located or otherwise corresponding PGW-U that supports a protocol supported by the UE. This PGW-U may then provide packet services to the UE, such as providing packet transit between the UE and one or more devices accessible via the Internet and/or an IP multimedia subsystem (IMS).

In various embodiments, an SGW-C may be configured to select an SGW-U using a round-robin or random selection method and indicate the identifier or address of the selected SGW-U to a PGW-C that may use the identifier or address as an identifier or address of a PGW-U. This the identifier or address of the selected SGW-U may be an address or identifier of a co-located SGW-U/PGW-U. The PGW-C may determine whether the PGW-U (e.g., co-located in the SGW-U/PGW-U) indicated by the identifier or address provided by the SGW-C supports the protocol requested by the UE and/or is otherwise capable of providing service to the UE, selecting another PGW-U (e.g., SGW-U/PGW-U) if not and notifying the SGW-C of a newly selected PGW-U (e.g., identifier of address of a newly selected SGW-U/PGW-U). For example, an SGW-C may receive an attach request from a UE via, for example, an eNodeB and MME. The SGW-C may randomly or round-robin select an SGW-U that may support any protocol (e.g., IPv4, IPv6, IPv4v6). The SGW-C may provide information associated with the selected SGW-U to a PGW-C (e.g., the address of the SGW-U/PGW-U).

In such embodiments, the PGW-C may, instead of (e.g., automatically) selecting as a PGW-U the identifier or address of the co-located SGW-U/PGW-U indicated by the SGW-C, negotiate for a PGW-U that supports a protocol supported by the UE that sent the attach request. For example, the PGW-C may receive the attach request and/or data associated therewith from the SGW-C, including an indication of a PDN or PDP type. The PGW-C may then determine whether the PGW-U associated with the identifier or address of an SGW-U/PGW-U indicated by the SGW-C corresponds to the protocol supported by the UE. If the SGW-U/PGW-U selected by the SGW-C supports the protocol supported by the UE, the PGW-C then selects the PGW-U originally selected by the SGW-C by using the address or identifier of the SGW-U/PGW-U to indicate the PGW-U to provide service to the UE. In some embodiments, the PGW-C may take no additional actions when the SGW-U/PGW-U selected by the SGW-C supports the protocol supported by the UE, while in other embodiments, the PGW-C may send a confirmation message to the SGW-C that confirms that the SGW-U/PGW-U originally selected by the SGW-C is compatible with the UE and/or otherwise reiterates the SGW-U/PGW-U originally selected by the SGW-C.

However, if the SGW-U (e.g., SGW-U/PGW-U) selected by the SGW-C does not support the protocol supported by the UE, the PGW-C then selects an alternative PGW-U (e.g., SGW-U/PGW-U) that supports the protocol supported by the UE. As the SGW-U and the PGW-U may be co-located and therefore share a common address, selecting this address as an identifier for either function essentially selects the a single SGW-U/PGW-U entity. The PGW-C may use this alternative PGW-U (e.g., alternative SGW-U/PGW-U) to provide service to the UE. In some examples, the PGW-C may be configured with data representing one or more PGW-Us (e.g., SGW-U/PGW-Us) associated with one or more corresponding protocols. Alternatively, or in addition, the PGW-C may be configured to determine such PGW-Us (e.g., SGW-U/PGW-Us) using various techniques (e.g., database look-up, requested information, etc.).

Based on selecting an alternative PGW-U (e.g., SGW-U/PGW-U) that supports the protocol supported by the UE, the PGW-C may transmit a message indicating the alternative PGW-U to the SGW-C that the SGW-U may determine to indicate an alternative SGW-U. Based on receiving this message, the SGW-C may update the SGW-U to be used for the UE to the alternative SGW-U (e.g., SGW-U/PGW-U) associated with the address or identifier indicated by the PGW-C. The alternative SGW-U and corresponding PGW-U (e.g., SGW-U/PGW-U) may then be used to provide packet services to the UE, such as providing packet transit between the UE and one or more devices accessible via the Internet and/or an IMS.

In various embodiments, an SGW-C may be configured to not select an SGW-U based on receiving an attach request from a UE but may instead delegate that operation to the PGW-C. For example, an SGW-C may receive an attach request from a UE via, for example, an eNodeB and a MME. The SGW-C may (e.g., automatically) forward the attach request to a PGW-C. Based on receiving this forwarded attach request, the PGW-C may select or otherwise determine an a PGW-U (e.g., SGW-U/PGW-U) that supports a protocol supported by the UE that sent the attach request. For example, the PGW-C may determine based on the attach request and/or data associated therewith received from the SGW-C (e.g., an indication of a PDN or PDP type) a protocol supported and/or preferred by the UE. The PGW-C may then select or otherwise determine a PGW-U (e.g., SGW-U/PGW-U) that supports that protocol. In some examples, because an SGW-U may be co-located with a PGW-U and may share a common address, selecting or determining that address selects or determines the corresponding function based on the selecting entity. For example, an SGW-C that selects an address of a particular SGW-U/PGW-U selects that SGW-U/PGW-U as an SGW-U, while a PGW-C that selects the same address of that particular SGW-U/PGW-U selects that SGW-U/PGW-U as an PGW-U. In some examples, the PGW-C may be configured with data representing one or more PGW-Us (e.g., SGW-U/PGW-Us) associated with one or more corresponding protocols. Alternatively, or in addition, the PGW-C may be configured to determine such PGW-Us (e.g., SGW-U/PGW-Us) using various techniques (e.g., database look-up, requested information, etc.).

Based on determining the appropriate PGW-U (e.g., SGW-U/PGW-U), the PGW-C may indicate the selected PGW-U (e.g., SGW-U/PGW-U) by transmitting an address or identifier to the SGW-C that may use that address or identifier to determine an SGW-U for serving the UE that initiated the attach request. The PGW-C may then also use the selected PGW-U (e.g., SGW-U/PGW-U) for providing service to the UE. For example, the PGW-U (e.g., SGW-U/PGW-U) determined by the PGW-C may be used to provide packet services to the UE associated with the attach request, such as providing packet transit between the UE and one or more devices accessible via the Internet and/or an IMS.

By facilitating the more efficient selection of appropriate user plane gateways for UEs, systems and methods described herein can improve the performance and increase the efficiency network resources (and therefore UE resources), while improving the user experience by reducing connection set-up times and connection establishment failures. For example, the methods and systems described herein may be more efficient and/or more robust than conventional techniques, as they may increase the efficiency of UE and network resource utilization by facilitating the selection of compatible gateways in response to UE attach requests and reducing signaling introduced into the network and with the UE in response to setting up incompatible connections. That is, the methods and systems described herein provide a technological improvement over existing attachment systems and processes by facilitating an improved user experience and increasing network efficiency, reducing the use of network and UE resources required when incompatible UE-gateway connections are attempted.

In addition to improving the efficiency of network and device resource utilization, the systems and methods described herein can provide more robust systems by, for example, making more efficient use of network devices and user devices by reducing unnecessary and/or unproductive device and network signaling and processing, thereby freeing network and user device resources for more productive operations.

Illustrative environments, signal flows, and techniques for implementing systems and techniques for gateway selections based on PDN and/or PDP types are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a UE 110 that may wirelessly communicate with an eNodeB 120. While referred to as an "eNodeB" for explanatory purpose herein, the eNodeB 120 may be any type of base station, including, but not limited to, any type of base transceiver station (BTS), NodeB, eNodeB, gNodeB, etc. The eNodeB 120 may communicate with other devices and elements in the core of a wireless communications network 101. The wireless communications network 101 may be any one or more networks that facilitate communications between devices of various types, such as computing device and mobile devices (e.g. UEs). Various connections between devices in the network 101 may be wired, wireless, or a combination thereof. In various embodiments, the wireless communications network 101 may facilitate communications with one or more wireless devices, such as UEs. The wireless communications network 101 may facilitate packet-based communications between such wireless devices and device on the Internet and/or one or more IMSs, such as IMS 180 and the Internet 190.

In order to facilitate data packet-based communications between the UE 110 and the IMS 180 and/or the Internet 190, a user data packet communications session may need to be established. As used herein, such a user data packet communications session may refer to and/or be associated with any user data communications bearer configured to carry user data packets (e.g., user plane traffic) and may be referred to as a data radio bearer. To perform set-up, tear-down, maintenance, and other control operations for a UE and/or an associated user data packet communications session, control communications (e.g., control plane traffic) may be exchanged between network devices and/or UE using signaling radio bearers (that may be referred to simply as "signaling").

In order to establish a user data packet communications session, the UE 110 may initially communicate with the eNodeB 120 using the LTE-Uu radio interface 112. For example, the UE 110 may transmit an attach request message to the eNodeB 120 via the LTE-Uu radio interface 112. The eNodeB 120 may forward this attach message (and/or data associated with the attach message) to an MME 130 over the S1-MME signaling interface 122. The MME 130 may forward this attach message (and/or data associated with the attach message) to an SGW-C 140 using the S11 signaling interface 132. The SGW-C 140 may communicate with a PGW-C 150 via an S5-C signaling interface 142. The SGW-C 140 may also, or instead, communicate with an SGW-U/PGW-U 160 via an Sxa signaling interface 144. The PGW-C 150 may also, or instead, communicate with the SGW-U/PGW-U 160 via an Sxb signaling interface 146. The SGW-U/PGW-U 160 may represent co-located SGW-U and PGW-U functions that share common resources, such as common physical hardware and one or more common (e.g., shared) network addresses.

The SGW-U/PGW-U 160 may be configured to transmit and receive user data packets associated with the UE 110. The SGW-U/PGW-U 160 may receive user data packets from and transmit user data packets to the UE 110 via the S1-U user plane interface. The SGW-U/PGW-U 160 may also, or instead, receive user data packets from and transmit user data packets to the IMS 180 via one or more of the IPv6 interface 162 and the IPv4/IPv4v6 interface 164. The SGW-U/PGW-U 160 may also, or instead, receive user data packets from and transmit user data packets to the Internet 190 via one or more of the IPv6 interface 166 and the IPv4/IPv4v6 interface 168. The various systems and techniques for device and/or entity selections for use in the establishment of the user data packet communications sessions configured to facilitate data packet traffic between the UE 110 and the IMS 180 and/or the Internet 190 are described in more detail herein.

Illustrative Signal Flows

Figure 2:
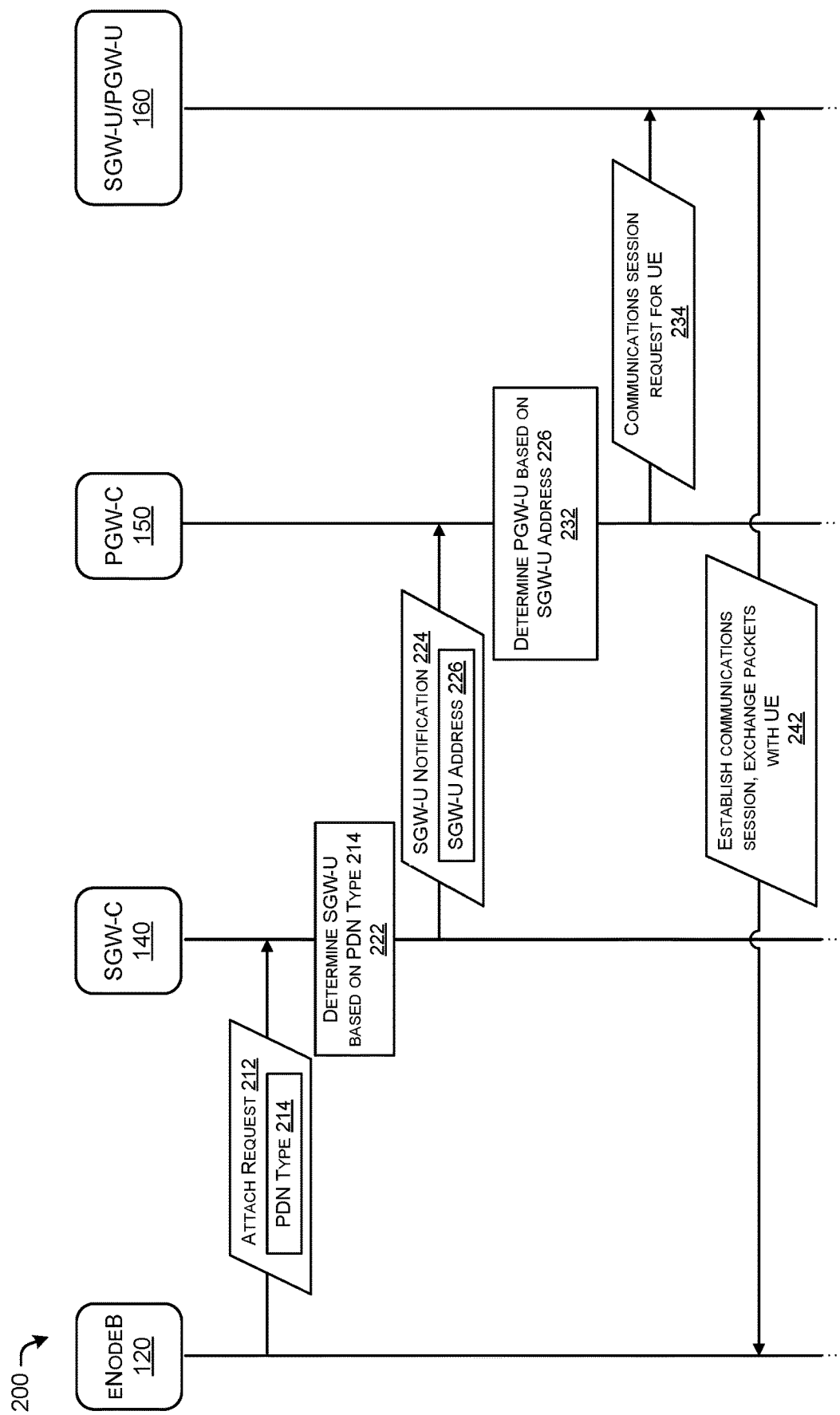
FIG. 2 is a diagram of an illustrative signal flow associated with serving gateway selection systems and techniques, in accordance with examples of the disclosure.

FIG. 2 illustrates an exemplary signal flow 200 of various messages that may be exchanged in one or more of the discoed systems and techniques for more efficiently performing serving gateway selection for a UE. Reference will be made in this description of the signal flow 200 to devices, entities, and interfaces illustrated in FIG. 1 and described in regard to that figure. However, the operations, signals, and signal flow illustrated in FIG. 2 and described herein may be implemented in any suitable system and/or with any one or more suitable devices and/or entities. Moreover, any of the operations, signals, and/or entities described in regard to FIG. 2 may be used separately and/or in conjunction with other operations, signals, and/or entities. All such embodiments are contemplated as within the scope of the instant disclosure.

In various embodiments, the eNodeB 120 may receive an attach request from a UE (e.g., the UE 110) and forward the attach request 212 to the SGW-C 140 (e.g., via an MME such as the MME 130). The attach request 212 may be the same attach request received from the UE or the attach request 212 may include data from and/or based on the attach request received from the UE. The attach request received from the UE and/or the attach request 212 may be, or may include, any request for packet data services (e.g., a PDN connectivity request) and/or may otherwise indicate any such request. In examples, the attach request 212 may include or indicate a PDN type 214 that may be an indication of a PDN type or PDP type that was included or otherwise indicated by the attach request received from the UE. In certain examples, the PDN type 214 may indicate IPv6, IPv4, and/or IPv4v6.

Based on the PDN type 214 indicated in the attach request 212, the SGW-C 140 may determine an SGW-U at operation 222. In certain examples, the SGW-C 140 may determine that the PDN type 214 indicates one or more of IPv4, IPv6, and IPv4v6. Alternatively, or in addition, the attach request may include data that the SGW-C 140 may use to determine one or more protocol types (e.g., one or more of IPv4, IPv6, and IPv4v6). Any such data may be used in the disclosed embodiments as a PDN type. Based on the PDN type 214, the SGW-C 140 may determine that SGW-U element of the SGW-U/PGW-U 160 is configured to support the associated PDN type. The SGW-U/PGW-U 160 may be a co-located entity with both SGW-U and PGW-U elements that each support the same protocols. For example, the SGW-C 140 may determine that the PDN type 214 indicated in the attach request 212 indicates IPv4. The SGW-C 140 may determine that the SGW-U element of the SGW-U/PGW-U 160 supports IPv4.

The SGW-C 140 may transmit an SGW-U notification message 224 to the PGW-C 150. The message 224 may include an identifier and/or address 226 of an SGW-U and/or otherwise indicate an SGW-U. In examples, the SGW-U address 226 may indicate or otherwise be associated with the SGW-U/PGW-U 160. At operation 232, the PGW-C 150 may determine the PGW-U indicated in the message 224 (e.g., by the SGW-U address 226) and may in turn determine as a PGW-U for providing service to the UE the SGW-U/PGW-U 160 associated with the address 226. In examples where the SGW-U address 226 identifies or is otherwise associated with the SGW-U/PGW-U 160, the PGW-C 150 may determine that the SGW-U address 226 identifies the PGW-U function of the SGW-U/PGW-U 160 and may the address 226 as the address for the PGW-U function of the SGW-U/PGW-U 160 and for providing packet data services to the UE associated with the attach request 212.

The PGW-C 150 may transmit a communications session request 234 to the SGW-U/PGW-U 160 requesting the establishment of a user data packet communications sessions and/or the facilitation of packet services for the UE associated with the attach request 212. The SGW-U/PGW-U 160 may then establish such a session and/or facilitate packet communications 242 for the UE. In examples, the communications 242 may include one or more packets exchanged by the UE 110 and the IMS 180 and/or the Internet 190.

Figure 3:
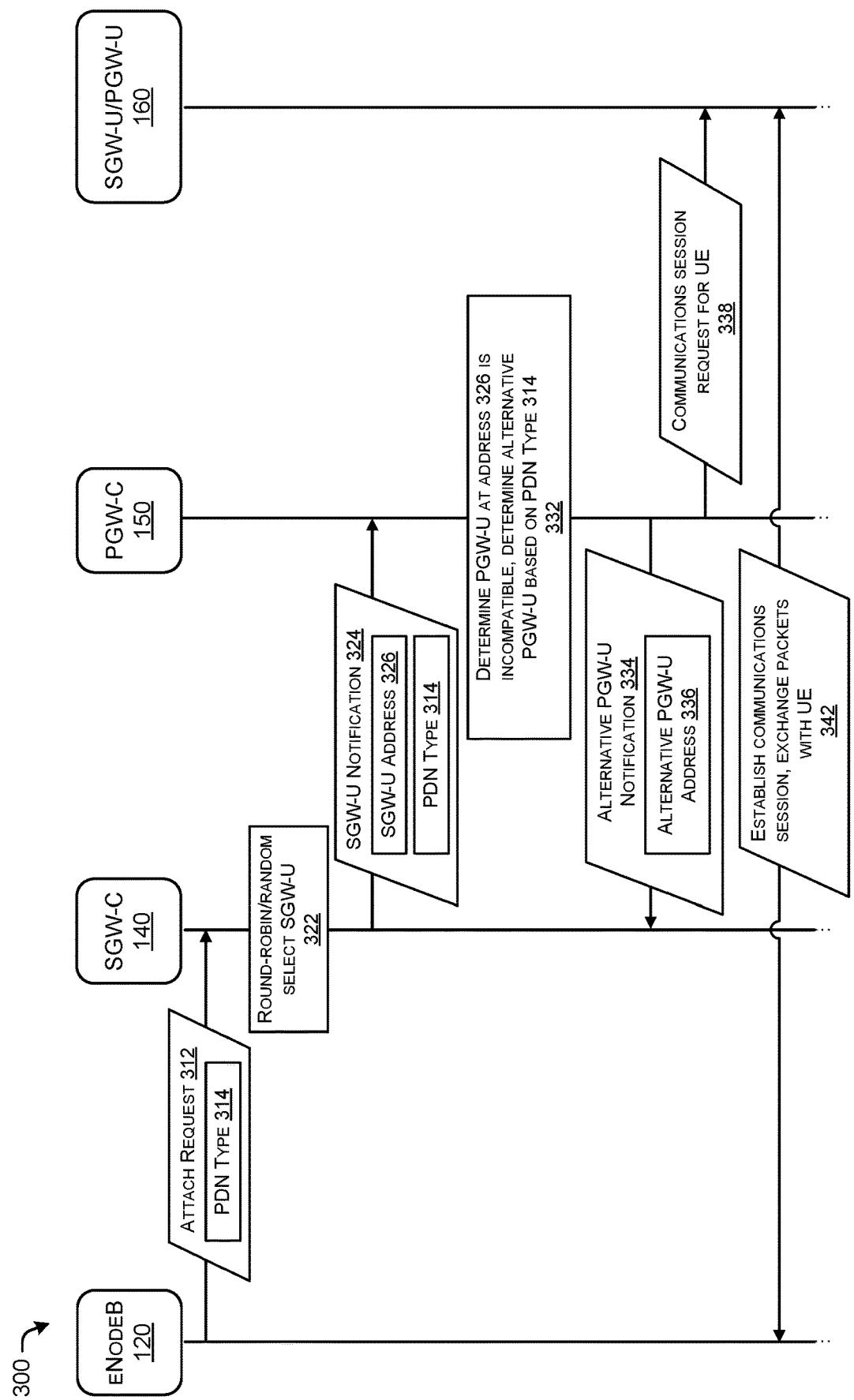
FIG. 3 is a diagram of an illustrative signal flow associated with serving gateway selection systems and techniques, in accordance with examples of the disclosure.

FIG. 3 illustrates an exemplary signal flow 300 of various messages that may be exchanged in one or more of the discoed systems and techniques for more efficiently performing serving gateway selection for a UE. Reference will be made in this description of the signal flow 300 to devices, entities, and interfaces illustrated in FIG. 1 and described in regard to that figure. However, the operations, signals, and signal flow illustrated in FIG. 3 and described herein may be implemented in any suitable system and/or with any one or more suitable devices and/or entities. Moreover, any of the operations, signals, and/or entities described in regard to FIG. 3 may be used separately and/or in conjunction with other operations, signals, and/or entities. All such embodiments are contemplated as within the scope of the instant disclosure.

In various embodiments, the eNodeB 120 may receive an attach request from a UE (e.g., the UE 110) and forward the attach request 312 to the SGW-C 140 (e.g., via an MME such as the MME 130). The attach request 312 may be the same attach request received from the UE or the attach request 312 may include data from and/or based on the attach request received from the UE. The attach request received from the UE and/or the attach request 312 may be, or may include, any request for packet data services (e.g., a PDN connectivity request) and/or may otherwise indicate any such request. In examples, the attach request 312 may include or indicate a PDN type 314 that may be an indication of a PDN type or PDP type that was included or otherwise indicated by the attach request received from the UE. In certain examples, the PDN type 314 may indicate IPv6, IPv4, and/or IPv4v6.

In various embodiments, the SGW-C 140 may be configured to select an SGW-U using a round-robin or random selection method at operation 322. The SGW-C 140 may transmit an SGW-U notification message 324 to the PGW-C 150 indicating the address 326 of the selected SGW-U as well as the PDN type 314. In examples, the SGW-U address 326 may identify or may be otherwise associated with an SGW-U function of a co-located SGW-U/PGW-U that is not compatible (e.g., does not support) the PDN type 314. The PDN type 314 may be the same PDN type 314 from the attach request 312 and/or may otherwise indicate a PDN type that corresponds to the PDN type 314 from the attach request 312.

At operation 332, the PGW-C 150 may determine, based on the PDN type 314, whether the PGW-U associated with the SGW-U address 326 is compatible with or otherwise supports the protocol indicated by the PDN type 314. In various embodiments, the address 326 may be a shared address of a co-located SGW-U/PGW-U. If the SGW-U/PGW-U associated with the address 326 supports the protocol indicated by the PDN type 314, (e.g., the SGW-U/PGW-U associated with the address 326 is configured to support the PDN type 314), the PGW-C 150 may transmit a communication session request 338 for the UE associated with the attach request 312 to that SGW-U/PGW-U requesting the establishment of a user data packet communications sessions and/or the facilitation of packet services for the UE. For example, if the SGW-U/PGW-U 160 is associated with the address 326 and the PGW-C 150 determines that the SGW-U/PGW-U 160 supports the protocol indicated by the PDN type 314, the PGW-C 150 may transmit the communications session request 338 to the SGW-U/PGW-U 160. The SGW-U/PGW-U 160 may then establish such a session and/or facilitate packet communications 342 for the UE. In examples, the communications 342 may be one or more packets exchanged by the UE 110 and the IMS 180 and/or the Internet 190.

Alternatively, the PGW-C 150 may determine, based on the PDN type 314, that the PGW-U associated with the SGW-U address 326 does not support the PDN type 314. For example, the PDN type 314 may indicate IPv4 and the PGW-U at the SGW-U address 326 may support only IPv6. Based on this determination of incompatibility, the PGW-C 150 may determine an appropriate alternative PGW-U (e.g., SGW-U/PGW-U) for providing service to the UE that supports the protocol indicated by the PDN type 314. The PGW-C 150 may transmit an alternative PGW-U notification message 324 back to the SGW-C 140 that includes alternative PGW-U address 336 that may indicate or otherwise be associated with a PGW-U (e.g., SGW-U/PGW-U) that is configured to support the PDN type 314. In examples, the alternative PGW-U address 336 may be an address for a co-located SGW-U/PGW-U that uses a shared address and provides both SGW-U and PGW-U functions as described herein. The PGW-C 150 may determine that the SGW-U/PGW-U 160 and/or the PGW-U function of the SGW-U/PGW-U 160 supports the PDN type 314 and may therefore configure the address of the SGW-U/PGW-U 160 as the alternative PGW-U address 336. In response to the message 334, the SGW-C 140 may update the SGW-U it has identified for use for user data packet services for the UE associated with the attach request 312 to the address indicated by the alternative SGW-U address 336 (e.g., the address of the SGW-U/PGW-U 160).

The PGW-C 150 may also request that the PGW-U associated with the alternative PGW-U address 336 provide service to the UE. In examples, the PGW-C 150 may request packet services for the UE associated with the attach request 312 from the SGW-U/PGW-U 160. The PGW-C 150 may transmit a communications session request 338 for the UE to the SGW-U/PGW-U 160. The SGW-U/PGW-U 160 may then establish such a session and/or facilitate packet communications 342 for the UE. In examples, the communications 342 may include one or more packets exchanged by the UE 110 and the IMS 180 and/or the Internet 190.

Figure 4:
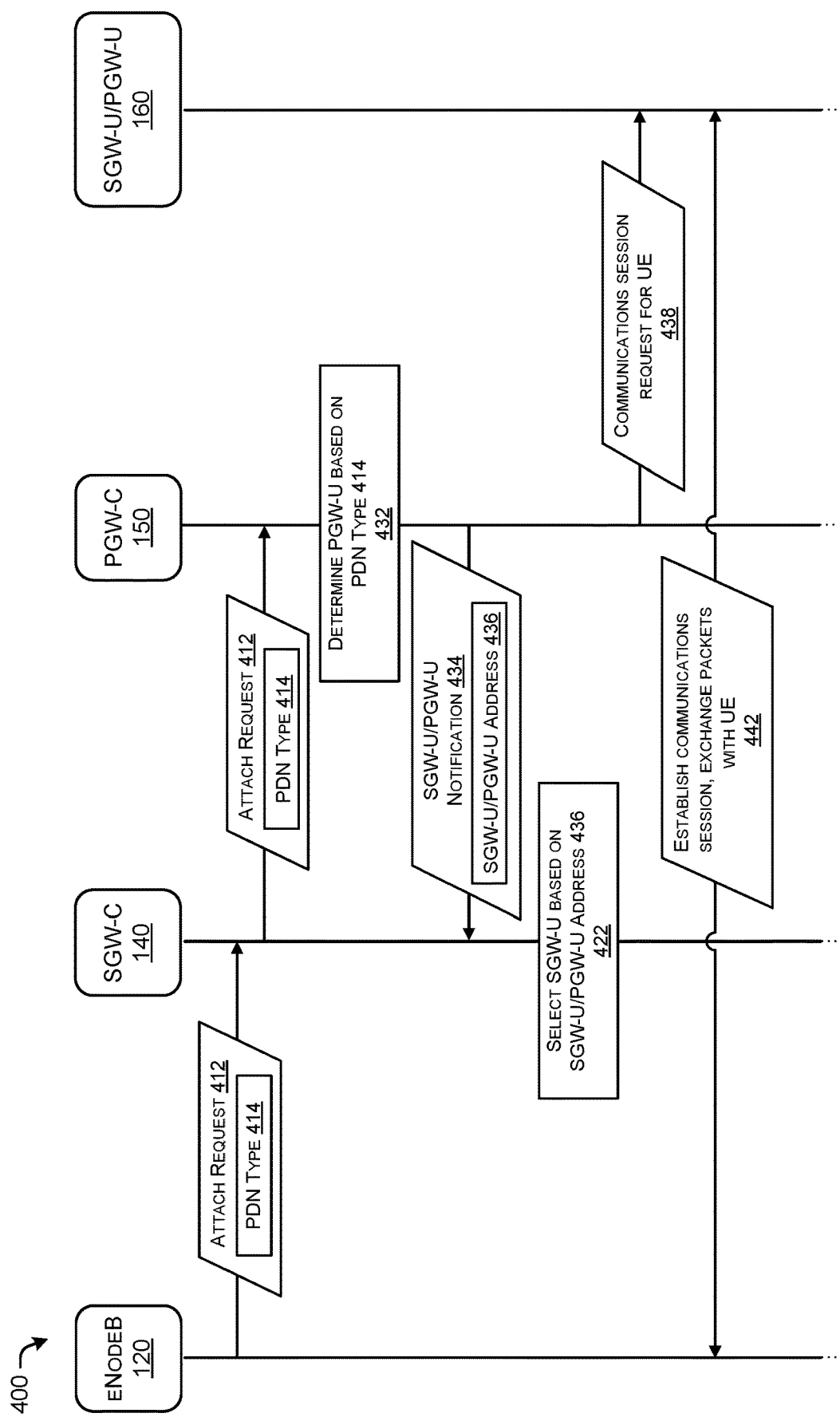
FIG. 4 is a diagram of an illustrative signal flow associated with serving gateway selection systems and techniques, in accordance with examples of the disclosure.

FIG. 4 illustrates an exemplary signal flow 400 of various messages that may be exchanged in one or more of the discoed systems and techniques for more efficiently performing serving gateway selection for a UE. Reference will be made in this description of the signal flow 400 to devices, entities, and interfaces illustrated in FIG. 1 and described in regard to that figure. However, the operations, signals, and signal flow illustrated in FIG. 4 and described herein may be implemented in any suitable system and/or with any one or more suitable devices and/or entities. Moreover, any of the operations, signals, and/or entities described in regard to FIG. 4 may be used separately and/or in conjunction with other operations, signals, and/or entities. All such embodiments are contemplated as within the scope of the instant disclosure.

In various embodiments, the eNodeB 120 may receive an attach request from a UE (e.g., the UE 110) and forward the attach request 412 to the SGW-C 140 (e.g., via an MME such as the MME 130). The attach request 412 may be the same attach request received from the UE or the attach request 412 may include data from and/or based on the attach request received from the UE. The attach request received from the UE and/or the attach request 412 may be, or may include, any request for packet data services (e.g., a PDN connectivity request) and/or may otherwise indicate any such request. In examples, the attach request 412 may include or indicate a PDN type 414 that may be an indication of a PDN type or PDP type that was included or otherwise indicated by the attach request received from the UE. In certain examples, the PDN type 414 may indicate IPv6, IPv4, and/or IPv4v6.

In various embodiments, the SGW-C 140 may be configured to forward the attach request 412 to the PGW-C 150, delegating the SGW-U determination operation to the PGW-C 150. Alternatively, or in addition, the SGW-C 140 may be configured to transmit data associated with or representing data in the attach request 412 to the PGW-C 150, including, for example, data representing the PDN type 414.

At operation 432, the PGW-C 150 may determine, based on the PDN type 414, a PGW-U that supports the protocol indicated by the PDN type 414. For example, the PGW-C 150 may determine that the PGW-U element of the SGW-U/PGW-U 160 supports the protocol indicated by the PDN type 414. In examples, the PGW-C 150 may determine an address of the PGW-U function of the SGW-U/PGW-U 160, which may be a shared address also used by the SGW-U function of the SGW-U/PGW-U 160. In examples, the PGW-C 150 may be configured with data representing one or more PGW-Us and/or SGW-U/PGW-Us associated with one or more corresponding protocols. Alternatively, or in addition, the PGW-C 150 may be configured to determine such PGW-Us and/or SGW-U/PGW-Us using various techniques (e.g., database look-up, requested information, etc.).

Based on determining the appropriate PGW-U (e.g., SGW-U/PGW-U), the PGW-C 150 may transmit an SGW-U/PGW-U notification message 434 to the SGW-C 140 that indicates the determined SGW-U/PGW-U (e.g., SGW-U/PGW-U 160) using the SGW-U/PGW-U address 436 (e.g., the address of SGW-U/PGW-U 160). At the operation 422, the SGW-C 140 may select as an SGW-U the SGW-U associated with the SGW-U/PGW-U address 436 (e.g., SGW-U/PGW-U 160) for serving the UE that initiated the attach request 412.

The PGW-C 150 may transmit a communications session request 438 for the UE to the SGW-U/PGW-U 160. The SGW-U/PGW-U 160 may then establish such a session and/or facilitate packet communications 442 for the UE. In examples, the communications 442 may include one or more packets exchanged by the UE 110 and the IMS 180 and/or the Internet 190.

Illustrative Operations

Figure 5:
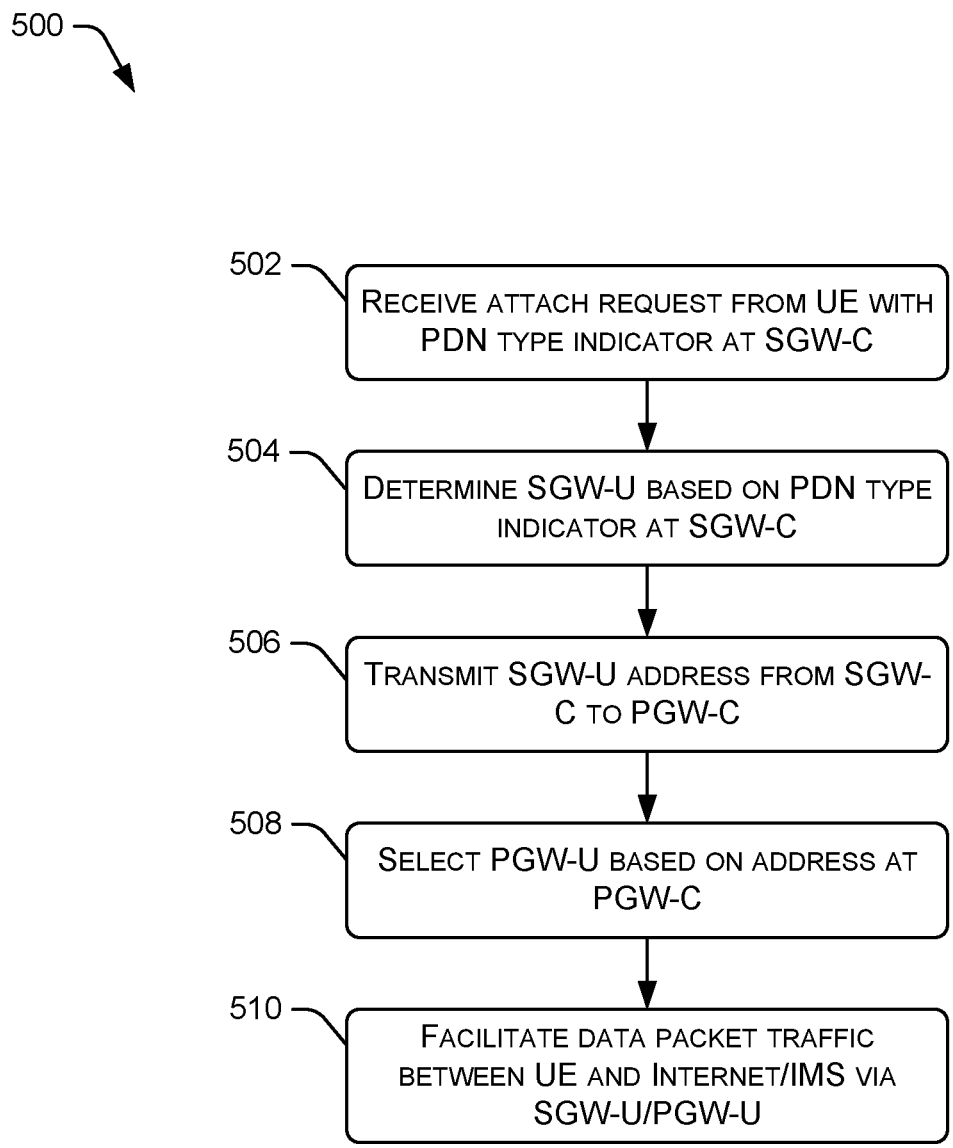
FIG. 5 is a flow diagram of an illustrative process for performing serving gateway selection, in accordance with examples of the disclosure.

FIG. 5 shows a flow diagram of an illustrative process 500 for performing serving gateway determination for a UE according to the disclosed embodiments. The process 500 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 500 may be described with reference to the wireless network environment 100 of FIG. 1, however other environments may also be used.

At block 502, an SGW-C may receive an attach request from a UE (e.g., via an eNodeB and/or an MME, and/or on an S11 interface). The received attach request may include a PDN type indicator and/or data that may be used to determine a PDN and/or PDP type. As noted herein, in examples, the PDN type indicator may indicate one or more of IPv4, IPv6, and IPv4v6.

At block 504, the SGW-C may determine an SGW-U based on data in the attach request and, in various embodiments, based on the PDN type indicator. For example, the SGW-C may determine the PDN type indicated in the attach request (e.g., IPv4, IPv6, IPv4v6) and then may determine, based on the PDN type, an SGW-U that is configured for and/or capable of supporting the PDN type. For example, if the PDN type is IPv4, the SGW-C may select an IPv4 SGW-U; if the PDN type is IPv6, the SGW-C may select an IPv6 SGW-U; and if the PDN type is IPv4v6, the SGW-C may attempt to select an IPv6 SGW-U but may fall back to selecting an IPv4 SGW-U if an IPv6 SGW-U is not available. The selected SGW-U may be an SGW-U function provided by a co-located SGW-U/PGW-U sharing a common address as described herein.

At block 506, the SGW-C may transmit a notification or otherwise provide information associated with the determined SGW-U to a PGW-C. For example, at block 506, the SGW-C may provide the address of the determined SGW-U to the PGW-C, which may be a common address also used by a PGW-U at a co-located SGW-U/PGW-U. At the block 508, the PGW-C, based on receiving such a notification and/or information, may determine to select the PGW-U for providing data packet services to the UE by using as the PGW-U the PGW-U associated with the address indicated by the SGW-C (e.g., address of a co-located SGW-U/PGW-U). As described herein, a collocated SGW-U and PGW-U may support the same protocol because they are co-located entities. Therefore, by selecting as a PGW-U the entity at the address indicated by the SGW-C, which may also be an address of an SGW-U associated with the protocol indicated by the PDN type in the attach request received from the UE, the SGW-C causes the selection, for example by the PGW-C, of a corresponding PGW-U that also supports a protocol supported by the UE.

At block 510, the determined SGW-U and/or PGW-U (e.g., SGW-U/PGW-U) may then be configured to provide packet services and/or other user plane services to the UE associated with the attach request received at block 502. For example, the SGW-U and/or PGW-U may provide packet transit between the UE and one or more devices accessible via the Internet and/or an IP multimedia subsystem (IMS).

Figure 6:
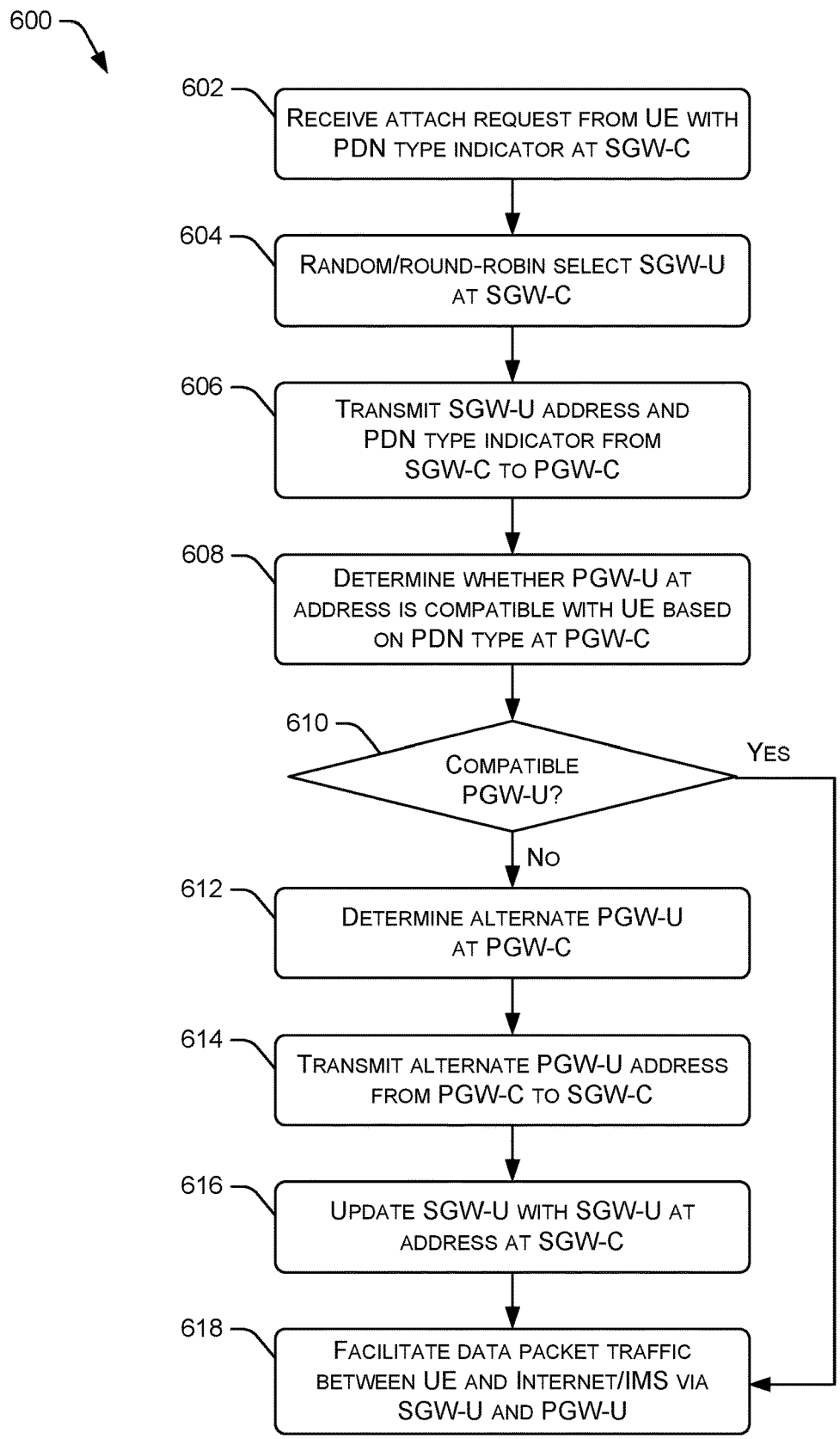
FIG. 6 is a flow diagram of an illustrative process for performing serving gateway selection, in accordance with examples of the disclosure.

FIG. 6 shows a flow diagram of an illustrative process 600 for performing serving gateway determination for a UE according to the disclosed embodiments. The process 600 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 600 may be described with reference to the wireless network environment 100 of FIG. 1, however other environments may also be used.

At block 602, an SGW-C may receive an attach request from a UE (e.g., via an eNodeB and/or an MME, and/or on an S11 interface). The received attach request may include a PDN type indicator and/or data that may be used to determine a PDN and/or PDP type. As noted herein, in examples, the PDN type indicator may indicate one or more of IPv4, IPv6, and IPv4v6.

At block 604, the SGW-C may determine or select an SGW-U using a round-robin or random selection method. Alternatively. The SGW-C may determine or select an SGW-U using a technique that does not account for the PDN type indicated in tin the attach request.

At block 606, the SGW-C may transmit a notification or other indication of the selected SGW-U to a PGW-C. For example, the SGW-C may transmit an address of the selected SGW-U, which may also be an address for a PGW-U that may be co-located with the selected AGW-U. This notification may include or otherwise indicate the PDN type that was indicated in the attach request At block 608, the PGW-C may receive the notification with a PDN type and an SGW-U address from the SGW-C and may determine, based on the PDN type, whether the PGW-U associated with the address indicated in the notification is configured and/or capable of providing packets services to the UE (e.g., is configured for the protocol associated with the PDN type). A block 610, a determination of a next operation may be performed based on whether the PGW-U at the address of the initially selected SGW-U is compatible with the PDN type.

If the PGW-U at the address of the initially selected SGW-U is configured to provide services to the UE using the indicated PDN type, at block 618, the PGW-C may selects the PGW-U at that address (e.g., SGW-U/PGW-U at that address) to provide service to the UE.

However, if the PGW-U at the address of the initially selected SGW-U is not configured to provide services to the UE using the indicated PDN type, at block 612, the PGW-C may determine an alternate PGW-U based on the PDN type by determining a PGW-U configured to provide packet data services to the UE using the indicated PDN type. In some examples, the PGW-C may be configured with data representing one or more PGW-Us and/or SGW-U/PGW-Us associated with one or more corresponding protocols. Alternatively, or in addition, the PGW-C may be configured to determine such PGW-Us and/or SGW-U/PGW-Us using various techniques (e.g., database look-up, requested information, etc.).

At block 614, the PGW-C may transmit a notification indicating the address of the determined alternate PGW-U and/or SGW-U/PGW-U to the SGW-C. Based on receiving this message, at block 616 the SGW-C may update the SGW-U to be used for the UE with the address indicated at 614, that is, the address associated with the SGW-U/PGW-U that supports the UE's indicated PDN type and provides both SGW-U and PGW-U functions.

At block 618, the alternate SGW-U and corresponding alternate PGW-U (e.g., alternate SGW-U/PGW-U) may then be configured to provide packet services and/or other user plane services to the UE associated with the attach request received at block 602. For example, the alternate SGW-U and/or alternate PGW-U may provide packet transit between the UE and one or more devices accessible via the Internet and/or an IMS.

Figure 7:
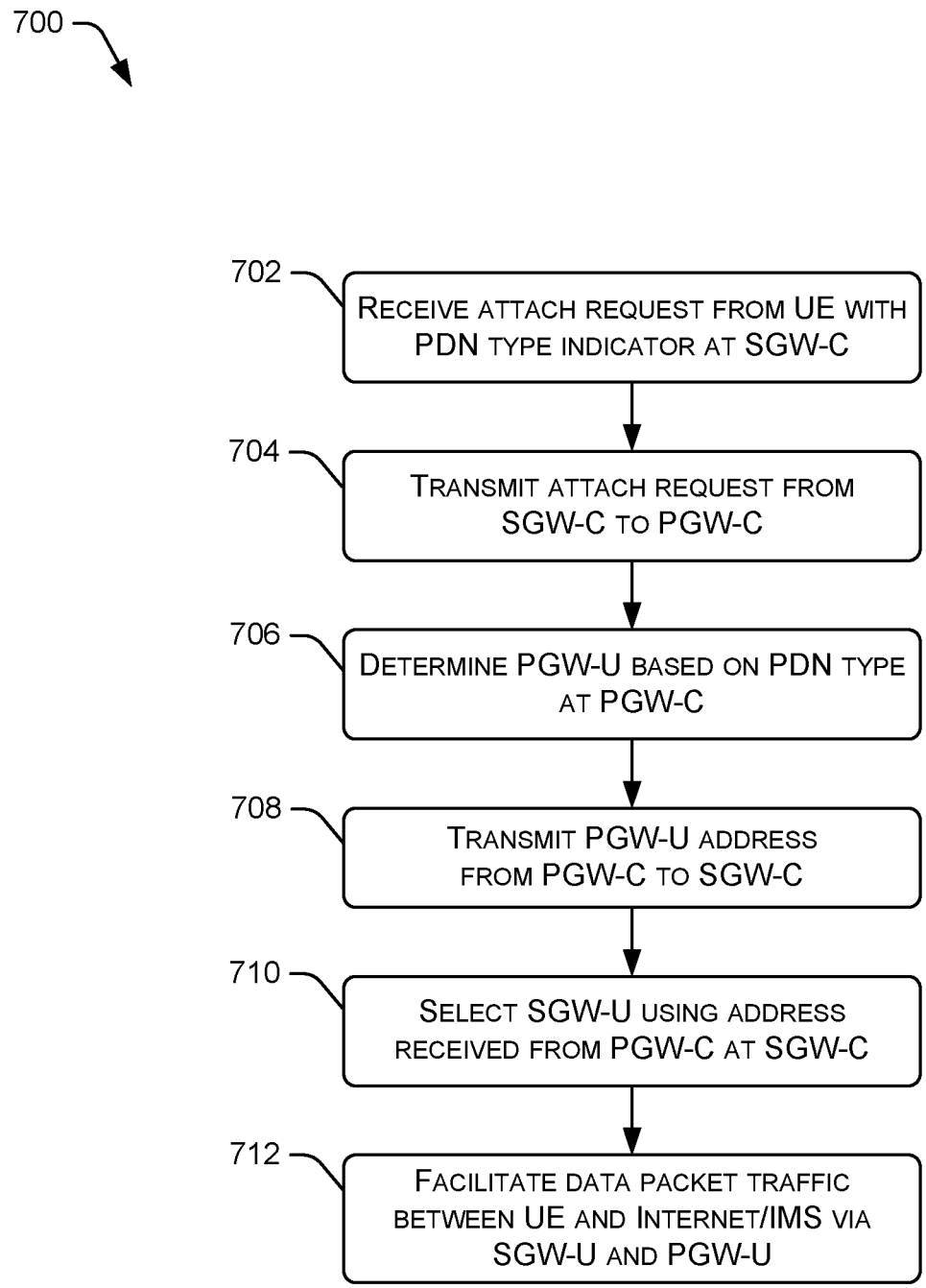
FIG. 7 is a flow diagram of an illustrative process for performing serving gateway selection, in accordance with examples of the disclosure.

FIG. 7 shows a flow diagram of an illustrative process 700 for performing serving gateway determination for a UE according to the disclosed embodiments. The process 700 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 700 may be described with reference to the wireless network environment 100 of FIG. 1, however other environments may also be used.

At block 702, an SGW-C may receive an attach request from a UE (e.g., via an eNodeB and/or an MME, and/or on an S11 interface). The received attach request may include a PDN type indicator and/or data that may be used to determine a PDN and/or PDP type. As noted herein, in examples, the PDN type indicator may indicate one or more of IPv4, IPv6, and IPv4v6.

At block 704, the SGW-C may forward the attach request to a PGW-C and/or may forward data representing at least a subset of the attach request, including a PDN type indicator to a PGW-C.

At block 706, the PGW-C may determine, based on receiving this forwarded attach request, a PGW-U that supports the protocol indicated by the PDN type in the attach request. As described herein, a PGW-U and an SGW-U may be co-located, share a common address, and support the same protocol. In some examples, the PGW-C may be configured with data representing one or more PGW-Us and/or SGW-U/PGW-Us associated with one or more corresponding protocols. Alternatively, or in addition, the PGW-C may be configured to determine such PGW-Us and/or SGW-U/PGW-Us using various techniques (e.g., database look-up, requested information, etc.).

Based on determining the appropriate PGW-U at block 706, at block 708 the PGW-C may transmit a notification indicating the determined PGW-U to the SGW-C. This notification may include the address of the determined PGW-U, which may, as described herein, also be the address of an SGW-U function where the PGW-U and SGW-U functions are co-located. At block 710, the SGW-C may, in response to this notification, select as an SGW-U the entity at the address indicated in the notification (e.g., a co-located SGW-U/PGW-U) for providing packet services to the UE that initiated the attach request.

At block 712, The PGW-C may then also use the selected PGW-U (e.g., SGW-U/PGW-U) for providing service to the UE. For example, the PGW-U and corresponding SGW-U determined by the PGW-C may be configured to provide packet services and/or other user plane services to the UE associated with the attach request received at block 702. For example, the SGW-U and/or PGW-U may provide packet transit between the UE and one or more devices accessible via the Internet and/or an IP multimedia subsystem (IMS).

In summary, by more efficiently selecting appropriate gateways to provide packet services to a UE and therefore preventing repeated attach requests and other wasteful resource utilizations, the disclosed systems and techniques may be able to increase the efficiency of usage of UE resources and wireless network resources, improving the user experience and performance of both the network and user devices.

Example User Equipment

Figure 8:
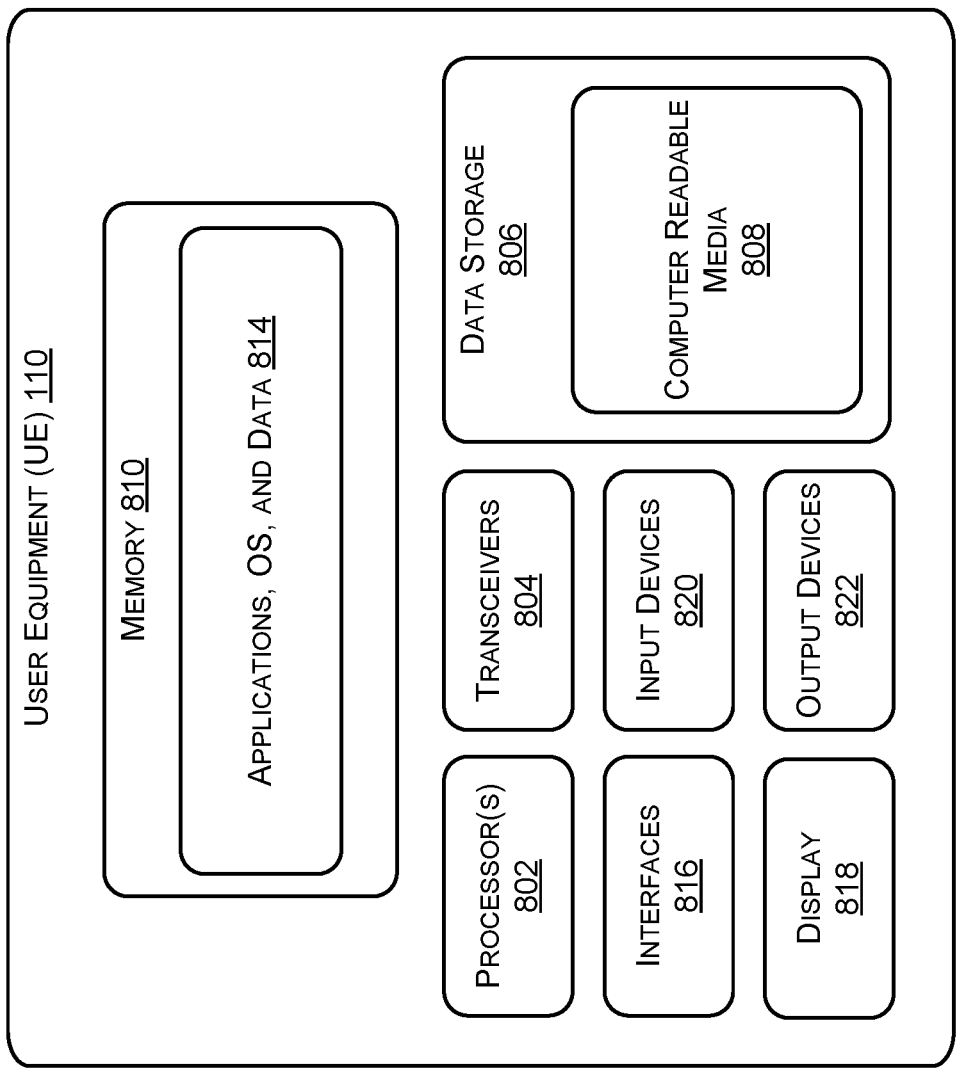
FIG. 8 is a schematic diagram of illustrative components in an example user device that is configured for serving gateway selection, in accordance with examples of the disclosure.

FIG. 8 is an example of a UE, such as UE 110, for use with the systems and methods disclosed herein, in accordance with some examples of the present disclosure. The UE 110 may include one or more processors 802, one or more transmit/receive antennas (e.g., transceivers or transceiver antennas) 804, and a data storage 806. The data storage 806 may include a computer readable media 808 in the form of memory and/or cache. This computer-readable media may include a non-transitory computer-readable media. The processor(s) 802 may be configured to execute instructions, which can be stored in the computer readable media 808 and/or in other computer readable media accessible to the processor(s) 802. In some configurations, the processor(s) 802 is a Central Processing Unit (CPU), a Graphics Processing Unit (GPU), or both CPU and GPU, or any other sort of processing unit. The transceiver antenna(s) 804 can exchange signals with a base station, such as eNodeB 120.

The UE 110 may be configured with a memory 810. The memory 810 may be implemented within, or separate from, the data storage 806 and/or the computer readable media 808. The memory 810 may include any available physical media accessible by a computing device to implement the instructions stored thereon. For example, the memory 810 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 110.

The memory 810 can store several modules, such as instructions, data stores, and so forth that are configured to execute on the processor(s) 802. In configurations, the memory 810 may also store one or more applications 814 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the eNodeB 120). The applications 814 may also include one or more operating systems and/or one or more third-party applications that provide additional functionality to the UE 110.

Although not all illustrated in FIG. 8, the UE 110 may also comprise various other components, e.g., a battery, a charging unit, one or more network interfaces 816, an audio interface, a display 818, a keypad or keyboard, and one or more input devices 820, and one or more output devices 822.

Example Computing Device

Figure 9:
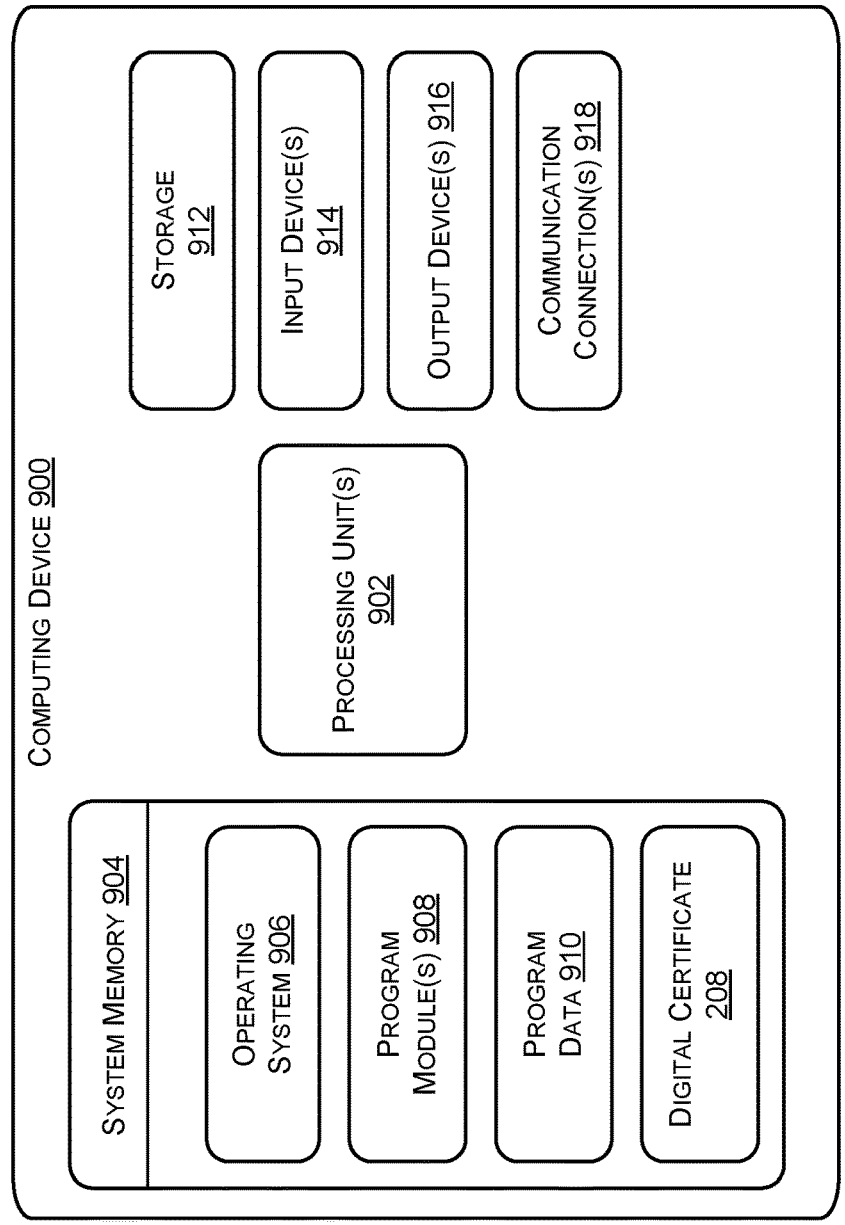
FIG. 9 is a schematic diagram of illustrative components in an example computing device that is configured for serving gateway selection, in accordance with examples of the disclosure.

FIG. 9 is an example of a computing device 900 for use with the systems and methods disclosed herein, in accordance with some examples of the present disclosure. The computing device 900 can be used to implement various components of a core network, a base station, and/or any servers, routers, gateways, gateway elements, administrative components, etc. that can be used by a communication provider. One or more computing devices 900 can be used to implement the network 101, for example. One or more computing devices 900 can also be used to implement base stations and other components.

In various embodiments, the computing device 900 can include one or more processing units 902 and system memory 904. Depending on the exact configuration and type of computing device, the system memory 904 can be volatile (such as RAM), non-volatile (such as ROM, flash memory, etc.) or some combination of the two. The system memory 904 can include an operating system 906, one or more program modules 908, and can include program data 910. The system memory 904 may be secure storage or at least a portion of the system memory 904 can include secure storage. The secure storage can prevent unauthorized access to data stored in the secure storage. For example, data stored in the secure storage can be encrypted or accessed via a security key and/or password.

The computing device 900 can also include additional data storage devices (removable and/or non-removable) such as, for example, magnetic disks, optical disks, or tape. Such additional storage is illustrated in FIG. 9 by storage 912.

Non-transitory computer storage media of the computing device 900 can include volatile and nonvolatile, removable and non-removable media implemented in any method or technology for storage of information, such as computer readable instructions, data structures, program modules, or other data. The system memory 904 and storage 912 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 900. Any such non-transitory computer readable storage media can be part of the computing device 700.

In various embodiment, any or all of the system memory 904 and storage 912 can store programming instructions which, when executed, implement some or all of the functionality described above as being implemented by one or more systems configured in the environment 100 and/or components of the network 101.

The computing device 900 can also have one or more input devices 914 such as a keyboard, a mouse, a touch-sensitive display, voice input device, etc. The computing device 900 can also have one or more output devices 916 such as a display, speakers, a printer, etc. can also be included. The computing device 900 can also contain one or more communication connections 918 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A: A method performed by a serving gateway, the method comprising: receiving, at a serving gateway control plane component from a mobile device, an attach request comprising an indication of a packet data network type; determining, at the serving gateway control plane component based at least in part on the packet data network type, a serving gateway user plane component; transmitting, from the serving gateway control plane component to a packet data network gateway control plane component, an address of the serving gateway user plane component, the address of the serving gateway user plane component causing the packet data network gateway control plane component to determine a packet data network gateway user plane component associated with the address of the serving gateway user plane component; and relaying, at the packet data network gateway user plane component, user data packets of the packet data network type between the mobile device and one or more packet data networks.

B: The method of paragraph A, wherein receiving the attach request at the serving gateway control plane component from the mobile device comprises receiving the attach request at the serving gateway control plane component via an eNodeB.

C: The method of paragraph A or B, wherein the packet data network gateway control plane component associates the address of the serving gateway user plane component with an address of the packet data network gateway user plane component.

D: The method of any of paragraphs A-C, wherein the packet data network gateway user plane component and the serving gateway user plane component are co-located.

E: The method of any of paragraphs A-D, wherein the one or more packet data networks comprise one or more of: the Internet; or an IP multimedia subsystem.

F: The method of any of paragraphs A-E, wherein the packet data network type comprises one or more of: IPv4; IPv6; or IPv4v6.

G: A serving gateway comprising: one or more processors; one or more transceivers; and non-transitory computer-readable media storing computer-executable instructions that, when executed by the one or more processors, cause the one or more processors to perform operations comprising: receiving an attach request from a mobile device, the attach request comprising an indication of a packet data network type; determining a serving gateway user plane component; and transmitting a notification causing a packet data network gateway control plane component to: determine a packet data network gateway user plane component; and relay user data packets of the packet data network type between the mobile device and one or more packet data networks using the packet data network gateway user plane component.

H: The serving gateway of paragraph G, wherein the serving gateway user plane component is determined based at least in part on the packet data network type.

I: The serving gateway of paragraph G or I, wherein the packet data network gateway user plane component and the serving gateway user plane component are co-located.

J: The serving gateway of any of paragraphs G-I, wherein transmitting the notification further causes the packet data network gateway control plane component to: determine that the serving gateway user plane component is incompatible with the packet data network type; and based at least in part on determining that the serving gateway user plane component is incompatible with the packet data network type, determine the packet data network gateway user plane component that is compatible with the packet data network type.

K: The serving gateway of paragraph J, wherein transmitting the notification further causes the packet data network gateway control plane component to transmit an address of the packet data network gateway user plane component to the serving gateway.

L: The serving gateway of any of paragraphs G-K, wherein: the notification comprises an address of the serving gateway user plane component; and transmitting the notification further causes the packet data network gateway control plane component to: determine that the packet data network gateway user plane component associated with the address is compatible with the packet data network type; and based at least in part on determining that the packet data network gateway user plane component is compatible with the packet data network type, determine the packet data network gateway user plane component.

M: The serving gateway of any of paragraphs G-L, wherein: the notification comprises the attach request; and transmitting the notification further causes the packet data network gateway control plane component to: determine the packet data network gateway user plane component based at least in part on the attach request; and transmit an address of the packet data network gateway user plane component to the service gateway.

N: The serving gateway of any of paragraphs G-M, wherein the packet data network type comprises one or more of IPv4; IPv6; or IPv4v6.

O: A non-transitory computer-readable media storing computer-executable instructions that, when executed by one or more processors, cause the one or more processors to perform operations comprising: receiving an attach request from a mobile device, the attach request comprising an indication of a packet data network type; determining a serving gateway user plane component; and transmitting an indication of the serving gateway user plane component to a packet data network gateway control plane component causing the packet data network gateway control plane component to: determine a packet data network gateway user plane component; and relay user data packets of the packet data network type between the mobile device and one or more packet data networks using the packet data network gateway user plane component.

P: The non-transitory computer-readable media of paragraph O, wherein the indication comprises an address of the serving gateway user plane component.

Q: The non-transitory computer-readable media of paragraph P, wherein the address of the serving gateway user plane component is a same address as an address of the packet data network gateway user plane component.

R: The non-transitory computer-readable media of any of paragraphs O-Q, wherein receiving the attach request from the mobile device comprises receiving the attach request at a serving gateway control plane component on an S11 interface via a mobility management entity.

S: The non-transitory computer-readable media of any of paragraphs O-R, wherein the one or more packet data networks comprise one or more of the Internet; or
an IP multimedia subsystem.

T: The non-transitory computer-readable media of any of paragraphs O-S, wherein the packet data network type comprises one or more of: IPv4; IPv6; or IPv4v6.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a serving gateway, the method comprising:
    receiving, at a serving gateway control plane component from a mobile device, an attach request comprising an indication of a packet data network type;
    determining, at the serving gateway control plane component based at least in part on the packet data network type, a serving gateway user plane component;
    transmitting, from the serving gateway control plane component to a packet data network gateway control plane component, an address of the serving gateway user plane component, the address of the serving gateway user plane component causing the packet data network gateway control plane component to determine a packet data network gateway user plane component associated with the address of the serving gateway user plane component; and
    relaying, at the packet data network gateway user plane component, user data packets of the packet data network type between the mobile device and one or more packet data networks,
    wherein the packet data network type comprises one or more of IPv4, IPv6, or IPv4v6.

2. The method of claim 1, wherein receiving the attach request at the serving gateway control plane component from the mobile device comprises receiving the attach request at the serving gateway control plane component via an eNodeB.

3. The method of claim 1, wherein the packet data network gateway control plane component associates the address of the serving gateway user plane component with an address of the packet data network gateway user plane component.

4. The method of claim 1, wherein the packet data network gateway user plane component and the serving gateway user plane component are co-located.

5. The method of claim 1, wherein the one or more packet data networks comprise one or more of:
    an Internet; or
    an IP multimedia subsystem.

6. A serving gateway comprising:
    one or more processors;
    one or more transceivers; and
    non-transitory computer-readable media storing computer-executable instructions that, when executed by the one or more processors, cause the one or more processors to perform operations comprising:
        receiving an attach request from a mobile device, the attach request comprising an indication of a packet data network type;
        determining a serving gateway user plane component based at least in part on the packet data network type; and
        transmitting a notification causing a packet data network gateway control plane component to:
            determine a packet data network gateway user plane component; and
            relay user data packets of the packet data network type between the mobile device and one or more packet data networks using the packet data network gateway user plane component,
    wherein the packet data network type comprises one or more of IPv4, IPv6, or IPv4v6.

7. The serving gateway of claim 6, wherein the packet data network gateway user plane component and the serving gateway user plane component are co-located.

8. The serving gateway of claim 6, wherein transmitting the notification further causes the packet data network gateway control plane component to:

determine that the serving gateway user plane component is incompatible with the packet data network type; and based at least in part on determining that the serving gateway user plane component is incompatible with the packet data network type, determine the packet data network gateway user plane component that is compatible with the packet data network type.

9. The serving gateway of claim 8, wherein transmitting the notification further causes the packet data network gateway control plane component to transmit an address of the packet data network gateway user plane component to the serving gateway.

10. The serving gateway of claim 6, wherein:
the notification comprises an address of the serving gateway user plane component; and
transmitting the notification further causes the packet data network gateway control plane component to:
determine that the packet data network gateway user plane component associated with the address is compatible with the packet data network type; and
based at least in part on determining that the packet data network gateway user plane component is compatible with the packet data network type, determine the packet data network gateway user plane component.

11. The serving gateway of claim 6, wherein:
the notification comprises the attach request; and
transmitting the notification further causes the packet data network gateway control plane component to:
determine the packet data network gateway user plane component based at least in part on the attach request; and
transmit an address of the packet data network gateway user plane component to the serving gateway.

12. A non-transitory computer-readable media storing computer-executable instructions that, when executed by one or more processors, cause the one or more processors to perform operations comprising:
receiving an attach request from a mobile device, the attach request comprising an indication of a packet data network type;
determining a serving gateway user plane component based at least in part on the packet data network type; and
transmitting an indication of the serving gateway user plane component to a packet data network gateway control plane component causing the packet data network gateway control plane component to:
determine a packet data network gateway user plane component; and
relay user data packets of the packet data network type between the mobile device and one or more packet data networks using the packet data network gateway user plane component,
wherein the packet data network type comprises one or more of IPv4, IPv6, or IPv4v6.

13. The non-transitory computer-readable media of claim 12, wherein the indication comprises an address of the serving gateway user plane component.

14. The non-transitory computer-readable media of claim 13, wherein the address of the serving gateway user plane component is a same address as an address of the packet data network gateway user plane component.

15. The non-transitory computer-readable media of claim 12, wherein receiving the attach request from the mobile device comprises receiving the attach request at a serving gateway control plane component on an S11 interface via a mobility management entity.

16. The non-transitory computer-readable media of claim 12, wherein the one or more packet data networks comprise one or more of:
an Internet; or
an IP multimedia subsystem.

* * * * *